US012507336B2

(12) United States Patent
Pronk et al.

(10) Patent No.: US 12,507,336 B2
(45) Date of Patent: Dec. 23, 2025

(54) SYSTEMS AND METHODS TO IMPROVE X-RAY TUBE FILAMENT FAILURE PREDICTION

(71) Applicant: KONINKLIJKE PHILIPS N.V., Eindhoven (NL)

(72) Inventors: Serverius Petrus Paulus Pronk, Vught (NL); Johannes Henricus Maria Korst, Eindhoven (NL); Tiblets Zeray Demewez, Eindhoven (NL); Hans Peter Sprong, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 183 days.

(21) Appl. No.: 18/556,706

(22) PCT Filed: Apr. 21, 2022

(86) PCT No.: PCT/EP2022/060616
§ 371 (c)(1),
(2) Date: Oct. 23, 2023

(87) PCT Pub. No.: WO2022/229005
PCT Pub. Date: Nov. 3, 2022

(65) Prior Publication Data

US 2024/0206044 A1 Jun. 20, 2024

Related U.S. Application Data

(60) Provisional application No. 63/180,682, filed on Apr. 28, 2021.

(51) Int. Cl.
*H05G 1/54* (2006.01)

(52) U.S. Cl.
CPC .................................... *H05G 1/54* (2013.01)

(58) Field of Classification Search
None
See application file for complete search history.

(56) References Cited

U.S. PATENT DOCUMENTS 5,901,197 A * 5/1999 Khutoryansky ...... H01J 35/064 378/207
6,212,256 B1 4/2001 Miesbauer
(Continued)

FOREIGN PATENT DOCUMENTS

EP 0207324 A3 9/1988
EP 2073242 A2 6/2009
(Continued)

OTHER PUBLICATIONS

International Search Report and Written Opinion Dated Aug. 4, 2022 for International Application No. PCT/EP2022/060616 Filed Apr. 21, 2022.
(Continued)

*Primary Examiner* — Hoon K Song

(57) ABSTRACT

A non-transitory computer readable medium (26) stores instructions executable by at least one electronic processor (20) to perform a method (100) of monitoring a component (10) of a medical device (1), particularly an x-ray tube. The method includes: retrieving information about the component from the medical device: deriving a wear metric indicative of wear of a portion, particularly the filament, of the component from the retrieved information; and in response to the wear metric satisfying a predetermined manual adjustment prohibition criterion, outputting an alert (30) indicating that the component of the medical device is nearing an end of its remaining useful life (RUL), and optionally that manual calibration should not be performed on the component.

19 Claims, 2 Drawing Sheets

(56) References Cited

U.S. PATENT DOCUMENTS

| | | | |
|---|---|---|---|
| 6,426,997 | B1 | 7/2002 | Fuchs |
| 2005/0157849 | A1 | 7/2005 | Radley |
| 2019/0317144 | A1 | 10/2019 | Xu |

FOREIGN PATENT DOCUMENTS

| | | | |
|---|---|---|---|
| EP | 3288347 | A1 | 2/2018 |
| JP | 2014039873 | A | 3/2014 |
| JP | 2020110261 | A | 7/2020 |

OTHER PUBLICATIONS

Gijsbers, et al: Chapter 7 in the Mantis Book: Cyber Physical System Based Proactive Collaborative Maintenance, River Publishers, Denmark, 2019.

* cited by examiner

SYSTEMS AND METHODS TO IMPROVE X-RAY TUBE FILAMENT FAILURE PREDICTION

CROSS REFERENCE TO RELATED APPLICATIONS

This application is the U.S. National Phase application under 35 U.S.C. § 371 of International Application No. PCT/EP2022/060616 filed Apr. 21, 2022, which claims the benefit of U.S. Provisional Patent Application No. 63/180,682 filed Apr. 28, 2021. These applications are hereby incorporated by reference herein.

FIELD

The following relates generally to the medical imaging arts, X-ray imaging arts, X-ray tube arts, X-ray tube maintenance arts, and related arts.

BACKGROUND

The X-ray tube is an expensive component of any medical X-ray imaging machine, and X-ray tubes have limited useful lifetimes of anywhere from a couple years to a decade or longer depending on installation-specific factors such as how intensively the X-ray imaging machine is used. Each X-ray tube also has individual performance characteristics. Hence, X-ray tube monitoring and maintenance is commonly performed. At initial installation of a new X-ray tube, the X-ray tube characteristics are measured. These characteristics typically include the relationship between tube voltage, filament current, and tube current, and possibly other parameters such as grid voltage depending on the tube configuration. The initial characteristic measurements result in the generation of X-ray tube calibration data for the new X-ray tube. For example, some X-ray imaging machines produced by Koninklijke Philips N.V. (Eindhoven, the Netherlands) store the X-ray tube calibration data as an X-ray tube adaptation table.

After this initial X-ray tube calibration, a manual calibration (also referred to herein as a manual adaptation) is performed occasionally, e.g., on a fixed schedule (such as every two years) or when the X-ray imaging device operator believes it may be useful. Manual adaptation is performed to adjust the initial calibration data for changes in the X-ray tube characteristics over time, principally due to filament wear. The filament of the X-ray tube is heated whenever it is run at a high (e.g., operational) filament current, which leads to evaporation of filament material. This thins the diameter of the filament over time, and thus increases filament resistance over time, so that a lower filament current is needed (at a given tube voltage and, if applicable, grid voltage) to achieve the same amount of filament heating and consequent tube current. This is sometimes referred to as filament wear. Between two manual calibrations, a correction factor (C-factor) is maintained to deal with the gradual changes in the filament resistance. The C-factor is reset to 1 at a manual calibration. Based on this C-factor, an additional factor, called the real C-factor, is maintained that is initially equal to the C-factor and follows its decay, but which is not reset to 1 upon a manual calibration. However, after a manual calibration, the resistance of the filament may have changed, causing a corresponding change in the real C-factor. The real C-factor decreases with filament wear.

Another common aspect of X-ray tube monitoring and maintenance is to provide automated estimation of the remaining useful life (RUL), or equivalently a time-to-failure prediction, for the X-ray tube. This estimate can be based simply on X-ray tube use hours. However, filament wear depends on more than just the tube use hours—for example, running the X-ray tube at a higher filament current will accelerate the filament wear. Hence, in the monitoring of some X-ray imaging machines, a more advanced predictive model is employed, such as artificial intelligence (AI) modeling of RUL based on historical X-ray tube performance information. Modern X-ray imaging machines are computerized and often maintain a machine log of key operational parameters and operating history, usually including information on X-ray tube voltage, filament current, and tube current, among other data. The machine log can thus be mined for data to be input to the AI modeling to generate the RUL estimate. In a common scenario, the time-to-failure estimate is displayed on a workstation of a remote monitoring engineer and/or on the X-ray imaging machine control console when the RUL falls below some threshold (e.g., on the order of one or two weeks). Such a prediction beneficially allows the X-ray imaging machine operator to plan ahead for replacing the X-ray tube, ideally during a time interval of low usage or during some other scheduled machine downtime.

Accuracy of the RUL estimation is beneficial. If the RUL estimation is erroneously long, then the X-ray tube may fail before it can be replaced. In this case, the X-ray imaging machine becomes unusable until the failed X-ray tube is replaced. This can have serious adverse consequences, most notably including delayed or canceled patient imaging sessions and consequent financial losses for the medical institution. X-ray tube failure can also produce electrical stress and/or damage to ancillary components of the X-ray imaging machine, making the maintenance more complex and costly. On the other hand, an RUL estimation that is erroneously short may lead to the X-ray tube being replaced too early, which can lead to additional cost.

The following discloses certain improvements to overcome these problems and others.

SUMMARY

In some embodiments disclosed herein, a non-transitory computer readable medium stores instructions executable by at least one electronic processor to perform a method of monitoring a component of a medical device. The method includes: retrieving information about the component from the medical device; deriving a wear metric indicative of wear of a portion of the component from the retrieved information; and in response to the wear metric satisfying a predetermined manual adjustment prohibition criterion, outputting an alert indicating that the component of the medical device is nearing an end of its remaining useful life (RUL).

In some embodiments disclosed herein, an apparatus includes an X-ray imaging device comprising an X-ray tube having a filament. At least one electronic processor is programmed to: retrieve X-ray tube information about the X-ray tube from the medical imaging device; derive a wear metric indicative of wear of a filament of the X-ray tube from the retrieved X-ray tube information; and in response to the wear metric satisfying a predetermined manual adjustment prohibition criterion, output an alert indicating that the X-ray tube is nearing an end of its RUL.

In some embodiments disclosed herein, a method of monitoring an X-ray tube of a medical imaging device includes: retrieving X-ray tube information about the X-ray tube from the medical imaging device to an electronic processor; using the electronic processor, deriving a wear metric indicative of wear of a filament of the X-ray tube from the retrieved X-ray tube information and determining whether the wear metric satisfies a predetermined manual adjustment prohibition criterion; and in response to the wear metric satisfying the predetermined manual adjustment prohibition criterion, outputting an alert on a display device of a remote monitoring workstation indicating that the X-ray tube (10) is nearing an end of its remaining useful life RUL.

One advantage resides in performing a manual calibration to optimize a lifetime of an X-ray tube only when appropriate.

Another advantage resides in providing a more accurate RUL estimate for an X-ray tube.

Another advantage resides in predicting a failure time of an X-ray tube to determine an optimal servicing time for an X-ray device, thereby reducing a down time of the X-ray device.

Another advantage resides in reducing delayed or cancelled X-ray examinations.

Another advantage resides in decreased financial losses for a medical institution based on accurately determining a predicted failure date of an X-ray tube.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
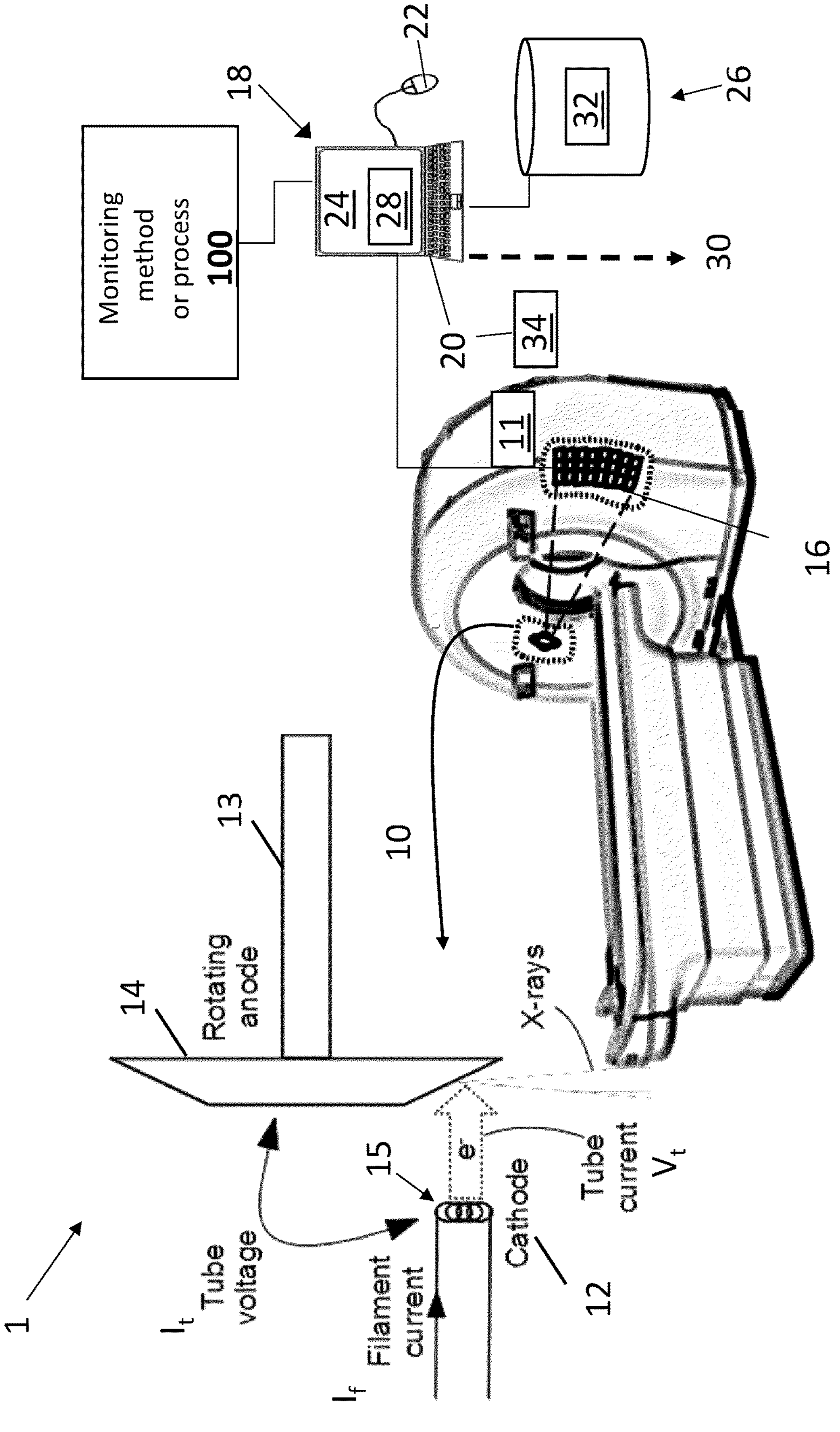
FIG. 1 diagrammatically illustrates an X-ray imaging device in accordance with the present disclosure.

Remote monitoring of a fleet of X-ray imaging systems, such as diagnostic computed tomography (CT) scanners and specialized imaging systems such as cardiovascular imaging systems (e.g., C-arm imaging systems) and image-guided therapy systems that employ X-ray imaging, can be provided. A component of this service can include receiving uploads of machine log data, and running various failure prediction models on that data. This permits recommending proactive maintenance prior to component failures, thus reducing the costs of machine downtime and multiple field service calls.

In particular, predictive modeling of X-ray tube failure can be provided. An X-ray tube typically is used for around 6-12 years before it needs to be replaced; however, the useful lifetime depends strongly on the frequency of operation. The main mode of tube failure is burnout of the filament, due to gradual evaporation of the filament material over time as the filament is run at high temperature to produce the X-ray beam. The failure prediction (or, equivalently, remaining useful life, i.e., RUL) model is applied on a run date (i.e., prediction date) $d_p$ and it outputs an estimated failure date $d_{ef}$. An alert indicating the estimated failure date $d_{ef}$ is issued when the difference $d_{ef}-d_p$ becomes less than a tube failure alert threshold, which is usually on the order of about one or two weeks. Ideally, when this alert is issued, the X-ray system operator can coordinate with the vendor or other maintenance service provider to arrange a convenient time for replacement of the X-ray tube. The arranged time may be a period of low usage (e.g. after hours), or during some other scheduled maintenance of the X-ray system. Additionally, the replacement X-ray tube can be ordered with some lead time, which can reduce or eliminate extra costs for expedited supply and shipping.

The X-ray tube failure prediction may employ artificial intelligence (AI) modeling of the RUL that is trained on historical data on X-ray tube lifetimes in similarly situated X-ray imaging systems. The AI model may consume as input relevant information extracted from the machine log of the X-ray imaging system, such as tube installation date and information bearing on the filament wear such as the cumulative time the filament has been driven at high electric current and the specific tube current used, along with other relevant tube operational information such as tube voltage and tube current. In general, a suitably trained AI model can provide a reasonably accurate time-to-failure prediction.

However, it is recognized herein that manual calibration (e.g. manual adaptation) can accelerate filament wear, thus leading to the X-ray tube failure prediction model overestimating the RUL of the X-ray tube. As noted, a manual calibration that is performed too early may result in replacing an X-ray tube too soon while the X-ray tube still has an acceptable amount of RUL, while a manual calibration that is performed too late can result in the X-ray tube failing more quickly than expected. As discussed previously, manual calibration (e.g. manual adaptation) may be run on a schedule, but also may be run by the X-ray system operator in an off-schedule manner. Particularly, as the X-ray tube nears end-of-life it can begin to exhibit drift in its operational characteristics. The X-ray system operator may then perform a manual adaptation to correct for the observed drift, aiming to prolong the X-ray tube's RUL. Manual adaptation updates the adaptation table or other X-ray tube calibration data to adjust for changes in the X-ray tube characteristics, principally due to filament wear. Usually, the filament wear removes filament material thereby increasing filament resistance, so that a lower filament current is needed (at a given tube voltage) to achieve the same tube current. During a manual adaptation, however, it is possible that the filament resistance decreases, e.g., due to recrystallization of the filament material.

However, the manual adaptation involves driving the X-ray tube at high tube voltage and filament current values and measuring the tube current.

Recognizing this problem, the following discloses providing an alert to inform the X-ray system operator and/or a remote monitoring engineer (RME) to not perform manual adaptation as the X-ray tube is nearing end-of-life. The alert can be generated in response to the tube failure prediction model predicting an interval of length $d_{ef}-d_p$ to estimated failure that is below a threshold time T, which is contemplated to be on the order of one or two months. Advantageously, this leverages the existing tube failure prediction model to also generate the "no manual adaptation" alert.

Alternatively, in some embodiments disclosed herein, the accumulated filament wear may be quantified using a prediction model that is different from the time-to-failure prediction model, but which also consumes the machine log data pertaining to operation of the X-ray tube. Compiled historical data can be used to construct an empirical model of filament wear as a function of usage. The "no manual adaptation" alert is issued when filament wear exceeds a threshold T.

In yet other embodiments disclosed herein, the "no manual adaptation" alert is issued based on a filament current adjustment made with respect to the initial adaptation table or other X-ray tube calibration data. The filament current adjustment is a standard adjustment made based on the measured tube current, e.g. by way of the manual adaptation, and this approach leverages this available information to issue the "no manual adaptation" alert when the magnitude (i.e., absolute value) of the filament current adjustment is outside of a threshold T.

The "no manual adjustment" alert is particularly useful in conjunction with the use of an X-ray tube failure prediction model (whether or not that model is used to trigger the "no manual adjustment" alert), as it solves the problem of unreliability of the tube failure prediction in the face of manual adaptation performed near to tube end-of-life.

With reference to FIG. 1, an illustrative medical device 1 is shown. The medical device 1 can be, for example, a computed tomography (CT) imaging device (as shown), or a C-arm imaging device such as are sometimes used for cardiac imaging, or an image guided therapy (IGT) system employing X-ray imaging, a fluoroscope, a digital radiography (DR) imaging device, or other an imaging device that utilizes X-ray imaging (hereinafter referred to as an "X-ray device" or variants thereof). Even more generally, the medical device 1 can be any medical device having a component for which a manual calibration can be performed to optimize the remaining useful life (RUL) of the component, such as a linear accelerator (LINAC). As shown in FIG. 1, the X-ray device 1 can include an X-ray tube 10 shown by partial removal of the housing of the CT scanner 10 in FIG. 1, and diagrammatically shown in the upper left of FIG. 1 as having a cathode 12 and an anode 14. The cathode 12 includes a filament 15 that when heated by a filament current $I_f$ emits electrons which can be attracted to the anode 14 by a tube voltage $V_t$ that is generated between the cathode 12 and the anode 14, and the anode 14 (in some examples, a rotating anode that rotates about a shaft 13 to distribute heat) comprises a target area on which the electrons $e^-$ impinge, thereby generating X-rays that form an X-ray beam used during image acquisition. The flow of electrons $e^-$ forms a tube current $I_t$ of the X-ray tube 10. The intensity of the X-ray beam produced by the X-ray tube 10 depends, often in a highly nonlinear fashion, on various operational parameters such as the mentioned tube voltage $V_t$, tube current, and filament current $I_f$. The diagrammatically shown X-ray tube 10 is a simplified representation—modern commercial X-ray tubes used in X-ray imaging devices often include additional components such as a grid whose geometry and electrical bias can be used to control the shape, focus, intensity, or other characteristics of the X-ray beam, and such components may introduce additional X-ray tube performance variables such as the grid voltage.

An X-ray detector 16 is configured to detect the X-ray radiation. As shown in FIG. 1, the detector 16 typically comprises a detector array. The detector 16 is also in electronic communication with an electronic processing device 18, such as a workstation computer, or more generally a computer. Images produced by the X-ray device 1 via the X-ray radiation generated by the cathode 12 and the anode 14 are processed by the electronic processing device 18. The illustrative CT scanner 1 employs tomographic imaging in which the X-ray tube 10 and detector 16 rotate together around an imaging subject to acquire a three-dimensional (3D) image of the subject. In other types of X-ray imaging devices these components may be fixed in position rather than revolving around the imaging subject, and hence provide a two-dimensional (2D) image. In a C-arm configuration, the X-ray tube 10 and the detector 16 can be moved to different vantage points (called "views") around the patient to (for example) provide clinically significant views of the heart, or in an IGT to provide a chosen view of an interventional procedure. In some embodiments, the electronic processing device 18 can also serve as a device controller of the X-ray device 1. In other embodiments, the electronic processing device 18 can also serve as a remote monitoring workstation of the X-ray device 1.

The electronic processing device 18 may also include a server computer or a plurality of server computers, e.g., interconnected to form a server cluster, cloud computing resource, or so forth, to perform more complex computational tasks. For example, in a common configuration a local electronic processing device serves as a controller for controlling the imaging device 1 to perform image acquisition, and also to record machine log data; while a server is connected via a hospital network and/or the Internet to occasionally receive updates of the machine log data. The server performs analyses on the uploaded machine log data such as applying a predictive failure model to predict when the X-ray tube 10 will fail. Additionally, in embodiments disclosed herein, the server performs predictive analysis to determine when the operator should be alerted to cease performing manual calibration of the X-ray tube 10. The workstation 18 includes typical components, such as an electronic processor 20 (e.g., a microprocessor), at least one user input device (e.g., a mouse, a keyboard, a trackball, and/or the like) 22, and a display device 24 (e.g., an LCD display, plasma display, cathode ray tube display, and/or so forth). In some embodiments, the display device 24 can be a separate component from the workstation 18, or may include two or more display devices.

The electronic processor 20 is operatively connected with one or more non-transitory storage media 26. The non-transitory storage media 26 may, by way of non-limiting illustrative example, include one or more of a magnetic disk, RAID, or other magnetic storage medium; a solid-state drive, flash drive, electronically erasable read-only memory (EEROM) or other electronic memory; an optical disk or other optical storage; various combinations thereof; or so forth; and may be for example a network storage, an internal hard drive of the workstation 18, various combinations thereof, or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions include instructions to generate a visualization of a graphical user interface (GUI) 28 for display on the display device 24.

The apparatus 10 is configured as described above to perform a method or process 100 of monitoring a component of a medical device. Although described herein as the medical device being the X-ray device 1 and the component being the X-ray tube 10, the method 100 can apply for any suitable component of any suitable medical device for which a manual calibration can reduce the remaining useful life (RUL) of the component. As another example, a LINAC typically includes a beam-generating component in which high voltages are used to generate a beam of accelerated subatomic particles or ions, and calibrating the beam-generating component may reduce the RUL of the beam-generating component. The non-transitory storage medium 26 stores instructions which are readable and executable by the at least one electronic processor 20 to perform disclosed operations including performing the monitoring method or process 100. In some examples, the methods 100 may be performed at least in part by cloud processing.

Figure 2:
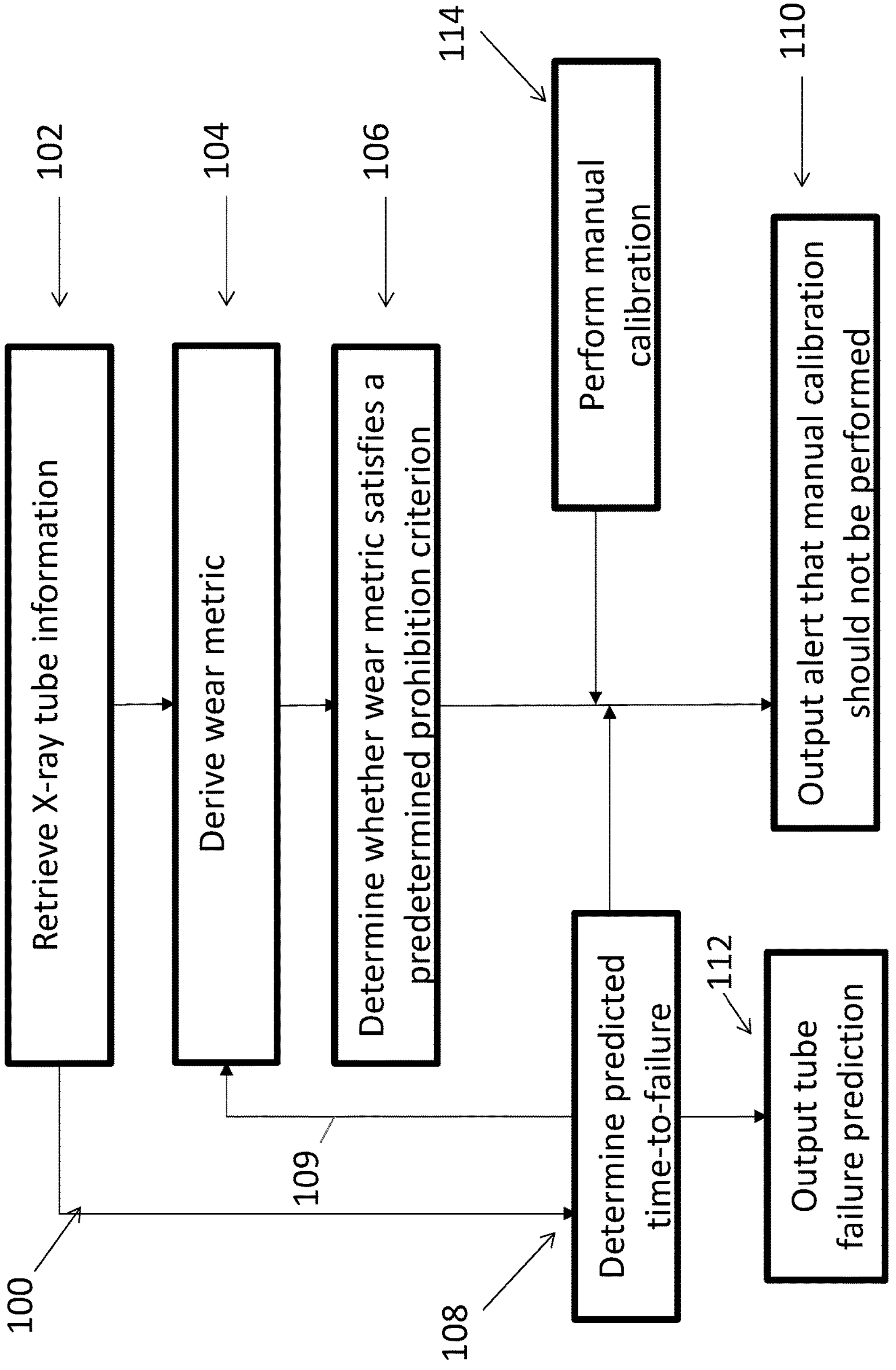
FIG. 2 diagrammatically illustrates an X-ray device monitoring method using the X-ray imaging device of FIG. 1.

With reference to FIG. 2, an illustrative embodiment of an instance of the monitoring method 100 is diagrammatically shown as a flowchart. At an operation 102, information about the component (i.e., the X-ray tube 10) is retrieved from the medical device (i.e., the X-ray device 1). The X-ray information can be retrieved by the electronic processing device 18 via the detector 16. At an operation 104, a wear metric indicative of wear of the filament 15 of the X-ray tube 10 is derived from the retrieved X-ray tube information. At an operation 106, the electronic processing device 18 is configured to determine whether the wear metric satisfies a predetermined manual adjustment prohibition criterion (which can be stored in the non-transitory computer readable medium 26).

In some example embodiments, the method 100 can include an optional operation 108, in which a time-to-failure of the X-ray tube 10 can be predicted based on the retrieved X-ray tube information and determining whether the predicted time-to-failure is less than a predetermined tube replacement alerting threshold time (which can be stored in the non-transitory computer readable medium 26), which is a time period at which an alert 30 indicating that the X-ray tube is nearing the end of its RUL and should be replaced, can be output. As indicated by an arrow 109, in some such embodiments the predicted time-to-failure may be an input to the operation 104 and used to estimate the filament wear.

The operations 102-106 can be performed in a variety of manners. In one example embodiment, the wear metric comprises the predicted time-to-failure of the X-ray tube 10 from the operation 108, and the predetermined manual adjustment prohibition criterion comprises the predicted time-to-failure of the X-ray tube 10 being less than a predetermined manual adjustment prohibition threshold time (which can be stored in the non-transitory computer readable medium 26) which can be a time period at which the predetermined manual adjustment prohibition criterion for issuing the "no manual adjustment" alert can be satisfied. For example, the predetermined manual adjustment prohibition threshold time is greater than the predetermined tube replacement alerting threshold time.

In another example embodiment, the retrieved X-ray tube information includes X-ray tube data for the X-ray tube 10 stored in a machine log 11, and the wear metric is derived from this information. For example, the machine log 11 may store the X-ray tube current, tube voltage, filament current, and optionally other operational parameters of the X-ray tube 10 (e.g., grid voltage) used during each imaging session performed by the imaging device 1. The operation 104 then applies an artificial intelligence (AI) model 34 implemented in the at least one electronic processor 20. The AI model 34 can be trained on historical machine log data for similarly situated X-ray tubes to estimate the wear metric based on the accumulation of wear of the filament due to the accumulation of imaging sessions. In yet another example embodiment, the X-ray tube calibration data includes data indicative of a resistance of the filament 15 of the X-ray tube 10 and the wear metric is derived from the data indicative of the resistance of the filament 15 of the X-ray tube 10.

In a further example embodiment, the X-ray tube calibration data includes a correction factor (e.g., a real C-factor in the case of some imaging devices produced by Koninklijke Philips NV) for an X-ray tube adaptation table 32 (which can be stored in the non-transitory computer readable medium 26), and the wear metric comprises the real C-factor. This can be an appropriate wear metric because the correction principally operates to correct for filament wear. In some examples such as certain X-ray imaging devices produced by Koninklijke Philips NV, the X-ray tube adaptation table 32 comprises a static adaptation table and a dynamic adaptation table. The static adaptation table quantifies the tube current at different setpoints for the tube voltage and filament current. The dynamic adaptation table specifies dynamic parameters such as filament heating and cooling time. The C-factor is, in these embodiments, a correction for the static adaptation table of the adaptation table 32, and as previously described the real C-factor is initially equal to the C-factor and follows its decay, but the real C-factor is not reset to 1 upon a manual calibration. A smaller magnitude of the real C-factor corresponds to a larger correction respective to the original static adaptation table (that is, without correction by any subsequent manual calibration), thus indicating greater filament wear.

At an operation 110, an alert 30 can be output indicating that a manual calibration procedure of the X-ray tube 10 should not be performed. In some examples, the manual calibration can be a manually initiated calibration (i.e., initiated by a technician or servicing engineer). Such manual calibrations can include, for example, running an X-ray tube 10 calibration program, operating the X-ray tube 10 at different filament currents $I_f$ and tube voltages $V_t$ and measuring the tube current $I_t$ for each filament current-tube voltage pair. In some embodiments, the alert 30 can be displayed on the GUI 28 via the display device 24 of the electronic processing device 18 (however, any suitable alert 30 can be output, such as, for example, an audio alert output via a loudspeaker (not shown) of the electronic processing device 18). In one example embodiment, when the operation 108 is performed and the time-to-failure is predicted, then the predicted time-to-failure can also be output on the display device 24.

Separately, if the predicted time-to-failure of the X-ray tube output by the predictive failure model 108 is within some threshold (e.g., within a one or two weeks), then, in an operation 112, a time-to-failure prediction (or, equivalently, a RUL prediction) is output. It is to be appreciated that the time-to-failure prediction 112 is separate and distinct from the "no manual calibration" alert 30 output by the operation 110. The time-to-failure prediction 112 informs the operator of an expected time at which the X-ray tube 10 is expected to fail. By contrast, the "no manual calibration" alert 30 output by the operation 110 informs the operator that manual calibrations should no longer be performed. In a typical scenario, the "no manual calibration" alert 30 is first output by the operation 110 at an earlier time (e.g., in the order of one or two months) than the estimated time-to-failure 112 is first presented, which is typically issued when the predicted time of X-ray tube failure is within one or two weeks or so.

In some embodiments disclosed herein, the accumulated filament wear may be quantified using machine log data pertaining to operation of the X-ray tube 10. Compiled historical data can be used to construct an empirical model of filament 15 wear as a function of usage. The "no manual adaptation" alert 30 is issued when filament wear exceeds a threshold T (which can be stored in the non-transitory computer readable medium 26).

In other embodiments disclosed herein, the "no manual adaptation" alert 30 can be issued based on a filament current adjustment made with respect to the initial adaptation table 32. The filament current adjustment is a standard adjustment made based on the measured tube current $I_t$, and this approach leverages this available information to issue the "no manual adaptation" alert 30 when the magnitude (i.e. absolute value) of the filament current adjustment is outside of a threshold T (which can be stored in the non-transitory computer readable medium 26). (As the filament current adjustment is usually downward as the filament resistance increases due to wear, the filament current adjustment may be considered to be a negative value).

In some embodiments, prior to the alert output operation 110 being performed, an optional operation 114 can be performed (i.e., earlier manual adaptation operations can be performed). At the operation 114, at least one manual calibration of the X-ray tube 10 can be performed in which each performed manual calibration of the X-ray tube 10 is operative to update the parameters stored in the adaptation table 32. Each performed manual calibration of the X-ray tube 10 is performed by the electronic processing device 18 in response to a manual adaptation input by a user to the X-ray device 1.

In some embodiments, the determined RUL, the alert 30, and/or the time-to-failure of the X-ray tube 10 can be input to a servicing entity that maintains a fleet of X-ray devices including the illustrative X-ray device 1. By way of illustrative example, the servicing entity may, for example, be the vendor of the X-ray device 1, or in the case of a large medical system the servicing entity may be a system-wide radiology department of the medical system. In one example, this data can be input to a device or fleet management system (along with analogous data from other X-ray devices of the fleet) that helps medical facilities plan and budget for component failure. To do so, an interface connecting the device or fleet management system with the electronic processing device 18 is displayed on the GUI 28 of the display device 24. The fleet management system collects and analyzes the RUL information from the X-ray device 1 along with other X-ray devices of the fleet. The analysis of the RUL information from the fleet may, for example, include a graph presented on the GUI 28 of number of expected X-ray tube failures per week (or per some other time unit) over the fleet. A user can interact with the displayed interface to provide the data to the device or fleet management system in order to make decisions about replacement X-ray tubes 10. A similar interface can be provided for other outside parties, such as a service organization to help plan maintenance schedule and parts availability, a service organization to provide or update any risk sharing contracts and so forth.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer readable medium storing instructions executable by at least one electronic processor to perform a method of monitoring a component of a medical device, the method comprising:

retrieving information about the component from the medical device;

deriving a wear metric indicative of wear of a portion of the component from the retrieved information;

in response to the wear metric satisfying a predetermined manual adjustment prohibition criterion, outputting an alert indicating that the component of the medical device is nearing an end of its remaining useful life (RUL) and indicating that manual calibration should not be performed;

predicting a time-to-failure of the component; and in response to the predicted time-to-failure being less than a predetermined tube replacement alerting threshold time, outputting the predicted time-to-failure of the component.

2. The non-transitory computer readable medium of claim 1, wherein the medical device is a medical imaging device, the component is an X-ray tube of the medical imaging device, and the method includes:

retrieving X-ray tube information about the X-ray tube from the medical imaging device;

deriving a wear metric indicative of wear of a filament of the X-ray tube from the retrieved X-ray tube information; and in response to the wear metric satisfying the predetermined manual adjustment prohibition criterion, outputting the alert indicating manual calibration of the X-ray tube should not be performed.

3. The non-transitory computer readable medium of claim 2, wherein:

the wear metric comprises the predicted time-to-failure of the X-ray tube; and the predetermined manual adjustment prohibition criterion comprises the predicted time-to-failure of the X-ray tube being less than a predetermined manual adjustment prohibition threshold time.

4. The non-transitory computer readable medium of claim 3, wherein the predetermined manual adjustment prohibition threshold time is greater than the predetermined tube replacement alerting threshold time.

5. The non-transitory computer readable medium of claim 2, wherein:

the retrieved X-ray tube information includes X-ray tube calibration data generated by manual calibration of the X-ray tube; and the wear metric is derived from the X-ray tube calibration data.

6. The non-transitory computer readable medium of claim 5, wherein:

the X-ray tube calibration data includes a correction factor (real C-factor) for the X-ray tube; and the wear metric comprises the real C-factor.

7. The non-transitory computer readable medium of claim 5, wherein:

the X-ray tube calibration data includes data indicative of a resistance of the filament of the X-ray tube; and, the wear metric is derived from the data indicative of the resistance of the filament of the X-ray tube.

8. The non-transitory computer readable medium of claim 1, wherein outputting the alert includes:

outputting the alert on a display device of a remote monitoring workstation.

9. The non-transitory computer readable medium of claim 8, wherein the remote monitoring workstation receives alerts from a medical device fleet that includes the medical device, and the method further comprises:

presenting a representation of the alerts from the medical device fleet on a graphical user interface (GUI) provided on the display device.

10. An apparatus, comprising:

an X-ray imaging device comprising an X-ray tube having a filament;

at least one electronic processor programmed to:

retrieve X-ray tube information about the X-ray tube from the medical imaging device;

derive a wear metric indicative of wear of a filament of the X-ray tube from the retrieved X-ray tube information;

in response to the wear metric satisfying a predetermined manual adjustment prohibition criterion, output an alert that the X-ray tube is nearing an end of its remaining useful life (RUL) and indicating that manual calibration should not be performed;

predict a time-to-failure of the X-ray tube based on the retrieved the X-ray tube information; and in response to the predicted time-to-failure being less than a predetermined tube replacement alerting threshold time, output the predicted time-to-failure of the X-ray tube.

11. The apparatus of claim 10, wherein:

the retrieved X-ray tube information includes X-ray tube calibration data generated by manual calibration of the X-ray tube; and the wear metric is derived from the X-ray tube calibration data.

12. A method of monitoring an X-ray tube of a medical imaging device, the method comprising:

retrieving X-ray tube information about the X-ray tube from the medical imaging device to an electronic processor;

using the electronic processor, deriving a wear metric indicative of wear of a filament of the X-ray tube from the retrieved X-ray tube information and determining whether the wear metric satisfies a predetermined manual adjustment prohibition criterion;

in response to the wear metric satisfying the predetermined manual adjustment prohibition criterion, outputting an alert on a display device of a remote monitoring workstation indicating that the X-ray tube is nearing an end of its remaining useful life (RUL) and indicating that manual calibration should not be performed;

using the electronic processor, predicting a time-to-failure of the X-ray tube based on the retrieved the X-ray tube information and determining whether the predicted time-to-failure is less than a predetermined tube replacement alerting threshold time; and in response to the predicted time-to-failure being less than the tube replacement alerting threshold time, outputting the predicted time-to-failure of the X-ray tube on the display device of the remote monitoring workstation.

13. The method of claim 12, wherein:

the wear metric comprises the predicted time-to-failure of the X-ray tube, and the predetermined manual adjustment prohibition criterion comprises the predicted time-to-failure of the X-ray tube being less than a predetermined manual adjustment prohibition threshold time.

14. The method of claim 12, wherein:

the retrieved X-ray tube information includes X-ray tube calibration data generated by manual calibration of the X-ray tube; and the wear metric is derived from the X-ray tube calibration data.

15. The method of claim 14, wherein:

the X-ray tube calibration data includes a correction factor (real C-factor) for the X-ray tube; and the wear metric comprises the C-factor.

16. The method of claim 14, wherein:

the X-ray tube calibration data includes data indicative of a resistance of the filament of the X-ray tube; and the wear metric is derived from the data indicative of the resistance of the filament of the X-ray tube.

17. The method of claim 12, further comprising:

prior to the outputting of the alert indicating manual calibration of the X-ray tube should not be performed, performing at least one manual calibration of the X-ray tube wherein each performed manual calibration of the X-ray tube is operative to evaporate material from the filament of the X-ray tube.

18. The method of claim 17, wherein each performed manual calibration of the X-ray tube is performed by the electronic processor in response to a manual adaptation input by a user to the medical device.

19. The method of claim 16, wherein outputting the alert includes:

providing a graphical user interface (GUI) on the display device; and transfer at least one of the RUL and the alert to an outside vendor via the GUI.

* * * * *